United States Patent
De Boer (10) Patent No.: US 12,429,208 B2
(45) Date of Patent: Sep. 30, 2025

(54) UNDERWATER OPTICAL- AND MOUNTING ASSEMBLY

(71) Applicant: OCTACUBE B.V., Baarn (NL)

(72) Inventor: Jan De Boer, Baarn (NL)

(73) Assignee: OCTACUBE B.V., Baarn (NL)

( * ) Notice: Subject to any disclaimer, the term of this patent is extended or adjusted under 35 U.S.C. 154(b) by 0 days.

(21) Appl. No.: 18/736,071

(22) Filed: Jun. 6, 2024

(65) Prior Publication Data
US 2024/0401792 A1 Dec. 5, 2024

Related U.S. Application Data

(63) Continuation of application No. 17/756,186, filed as application No. PCT/NL2020/050737 on Nov. 23, 2020, now Pat. No. 12,031,709.

(30) Foreign Application Priority Data

Nov. 21, 2019 (NL) ..................................... 2024282

(51) Int. Cl.
F21V 31/00 (2006.01)
F21W 131/401 (2006.01)

(52) U.S. Cl.
CPC ..... F21V 31/005 (2013.01); *F21W 2131/401* (2013.01)

(58) Field of Classification Search
CPC . F21V 31/005; F21V 29/83; F21W 2131/401; F16J 15/062; F16J 15/32
See application file for complete search history.

(56) References Cited

U.S. PATENT DOCUMENTS

1,968,072 A * 7/1934 Creighton ................. F21S 8/00
362/267
9,835,298 B2 * 12/2017 Doyle ....................... F21L 4/00
(Continued)

*Primary Examiner* — Tsion Tumebo
(74) *Attorney, Agent, or Firm* — MENDELSOHN DUNLEAVY P.C.; Kevin J. Dunleavy (57) ABSTRACT

An assembly, in particular an underwater optical assembly is provided. The assembly comprises a tubular wall mount, a housing and a seal. The wall mount has a cylindrical bore portion and the housing comprises a head and a stem rearwardly protruding from the head along an axis. The head defines a chamber with a window for dry housing an optical device in the chamber and the stem comprising an enclosed channel in fluid communication with the chamber. The stem has a cylindrical stem portion mated to the bore portion. The assembly is configured such that in an assembled configuration the stem portion fits the bore portion in an axial direction, the head is located in front of at least the bore portion of the wall mount, the housing being attached to the wall mount and plugging the wall mount with the seal extending substantially radially between the stem portion and the bore portion sealing the assembly circumferentially watertight. The head has a radial head size and the stem has a radial stem size, wherein the head size is larger than the stem size. The head has one or more circumferential walls forwardly protruding from a substantially radial rear wall, the stem rearwardly protruding from the rear wall. The stem and the one or more circumferential walls each have a thickness in radial direction, defining a rear wall area between a radial outside of the stem and a radial inside of the one or more circumferential walls, wherein the rear wall has, for at least half the radial area a thickness in axial direction that is less than a thickness in radial direction of the circumferential wall, and preferably less than a thickness in radial direction of the stem.

24 Claims, 4 Drawing Sheets

(56) References Cited

U.S. PATENT DOCUMENTS

| | | |
|---|---|---|
| 9,915,419 B2 | 3/2018 | Potucek et al. |
| 10,139,094 B2 | 11/2018 | Reichenbach et al. |
| 2004/0108119 A1 | 6/2004 | Maguire et al. |
| 2007/0139913 A1 | 6/2007 | Savage |
| 2008/0232106 A1 | 9/2008 | Brune et al. |
| 2009/0120940 A1 | 5/2009 | Shah |
| 2011/0012356 A1* | 1/2011 | Burnham ................ F21S 9/046 290/52 |
| 2011/0267834 A1* | 11/2011 | Potucek ................ F21V 29/70 362/267 |
| 2012/0113654 A1 | 5/2012 | Dai |
| 2016/0323952 A1 | 11/2016 | Li |
| 2020/0408381 A1 | 12/2020 | Vogtner et al. |

\* cited by examiner

UNDERWATER OPTICAL- AND MOUNTING ASSEMBLY

CROSS-REFERENCE TO RELATED APPLICATIONS

This application is a continuation of U.S. patent application Ser. No. 17/756,186 filed on May 18, 2022, which, in turn, is a 371 continuation of PCT/NL2020/050737, filed on Nov. 23, 2020, which, in turn, claims priority to Netherlands patent application no. 2024282, filed on Nov. 21, 2019, the disclosures of which are hereby incorporated by reference in their entirety as if fully set forth herein.

TECHNICAL FIELD

The present disclosure relates to underwater fixtures, in particular for wall-mounted fixtures such as under water lighting for ponds, swimming pools and the like.

BACKGROUND

Underwater lighting for swimming pools and the like is well known. Generally, the light is provided by lamps mounted in the walls of the pool. In the past, high power incandescent lamps and metal vapour lamps were used. More recently Light Emitting Diodes (LEDs) are used as the lamps.

Since all underwater lamps are electrically powered, care has to be taken to separate dry and wet regions in order to prevent short circuiting and/or electrical hazards to users of and staff for the pool etc. Other common concerns comprise mechanical and electrical robustness of the lamp; serviceability of the lamps and parts; manufacturability and costs; design; size; water tightness of the swimming pool as a whole; pool type (e.g. concrete, coated, tiled, liner, steel skin, etc.); virgin construction or retrofitting; etc.

Some examples of references to underwater lighting can be found in product information of the companies Behnke regarding PAR56 underwater lights; Wibre regarding recessed spotlights; and WaterVision regarding recessed housings for WV15 pool lights, as well as in patent literature such as DE 199 52 584, BR 9002000-6, WO 2006/094346, DE 20 2013 104 885, US 2016/0323952, and FR 3 052 233. Further aspects of underwater lights are disclosed in TW 201 243 234 A, EP 2 600 041 A1, CN 204 285 168 U, US 2008/232106 A1, US 2004/108119 A1, US 2009/120940 A1, and WO 2014/106121 A1.

However, there remains a desire for improvement, in particular regarding cost reduction and increased robustness.

SUMMARY

Herewith, in an aspect, an assembly, in particular an underwater optical assembly is provided.

The assembly comprises a tubular wall mount, a housing and a seal. The wall mount has a cylindrical bore portion and the housing comprises a head and a stem rearwardly protruding from the head along an axis. The head defines a chamber with a window for dry housing an optical device in the chamber and the stem comprising an enclosed channel, preferably in fluid communication with the chamber. The stem has a cylindrical stem portion mated to the bore portion. The assembly is configured such that in an assembled configuration the stem portion fits the bore portion in an axial direction, the head is located in front of at least the bore portion of the wall mount, the housing being attached to the wall mount and plugging the wall mount with the seal extending substantially radially between the stem portion and the bore portion sealing the assembly circumferentially watertight.

The optical device may comprise one or more light source(s), in particular high power LED lights and/or one or more cameras, wherein the optical devices may be suitably arranged in the housing behind the window. The stem may accommodate a cable connected with the optical device for transmitting power and/or signals to and/or from the respective device. The window may be at least partly plane and/or at least partly domed. Also or alternatively, one or more optical elements such as lenses, filters, prisms, reflectors, etc. may be provided, possibly at least partly integrated in at least part of the window and/or the chamber.

Such underwater optical assembly facilitates mounting the optical device and enables a small volume. By the radial sealing configuration, screws or other fasteners traditionally employed for clamping seals in axial direction may be obviated, allowing reduction of one or more of complexity, costs and size of the assembly.

The wall mount may form a wall feedthrough for a cable to an optical device in the housing. Also or alternatively, the wall mount may be connected to a cable conduit for together forming a wall feedthrough, e.g. the cable conduit comprising a tube or tube assembly through a wall portion. The head and the stem may be unitary, possibly monolithic, which may provide robustness and/or may facilitate construction. The housing, in particular a unitary housing, may be constructed light-weight which reduces material costs and which may facilitate temperature control of the housing and/or any optical element(s) therein.

The head may have a significantly larger size than the stem and/or the wall mount, in particular in a radial direction. In particular, the housing may have a radial housing size and the stem may have a radial stem size, wherein the housing size may be larger than the stem size, in a range of 2-8 times the stem size, preferably in a range of 3.5-5 times the stem size.

The head having a significantly larger size than the stem and/or the wall mount may provide one or more of: limiting an insertion depth of the housing into the wall mount, reducing a wall feedthrough size, reducing a sealing surface, increasing a sealing pressure, providing freedom of design, reducing material costs, and increasing area of the housing with respect to the stem e.g. for increasing a number of light sources in the chamber and/or increasing a size of the window for emission of light from the light source(s) and/or field of view.

The underwater light assembly is particularly suitable for high power lighting of 2000 lm or more, in some cases 6000 lm or more, or even significantly higher, which may be provided by LEDs as the optical devices.

The enclosed channel may extend through the stem from one axial side of the seal to an opposite axial side and the assembly may then be configured such that in the assembled state the chamber is in fluid communication with a space behind the seal, as seen from the head.

Thus, the chamber may be in fluid communication with the bore portion and/or with a space in fluid communication with the bore, in particular with a dry space within or behind a wall into which the wall mount is mounted. This allows ventilation of the optical source chamber and it facilitates use of cables and/or connection systems incompatible with being wet and/or submerged.

By the housing plugging the wall mount and the watertight sealing, the assembly may reduce water-compatibility requirements such as cable quality. In particular, it may obviate cable glands traditionally employed both at a lamp or camera housing and at a wall mount. This reduces one or more of complexity, costs and size of the assembly. E.g. in traditional underwater lamps and/or cameras it is a common problem that a cable gland in a recessed pot is poorly accessible, which accessibility is further reduced with reductions in size of the pot related to ever smaller lamps and/or cameras. Moreover, a length of cable between and fixed by two cable glands (lamp side and wall side, respectively) always is in contact with the water and must be accommodate in the pot, which may be complicated by mounting fixtures for mounting the housing in the pot. Such complications and size considerations are significantly reduced.

The assembly, in particular the housing, may comprise a skirt and/or a spacer which skirt and/or spacer may extend aside from and along at least part of the stem, e.g. from the head. The skirt and/or spacer may then be configured to define and/or comprise one or more openings for passage of water.

The skirt and/or spacer partially overlaps the stem, in radial direction. The skirt and/or spacer allow engaging the wall mount and/or a wall portion into which the wall mount is mounted. This may cover portions of a wall and/or the wall mount, e.g. for safety and/or aesthetics. Also or alternatively, spacing the head from the wall mount and/or from the wall portion by a given distance is facilitated. This may facilitate one or more of positioning the housing, mounting and/or unmounting the housing, and enabling or establishing a water flow along a rear side of the head. In particular with the latter in mind, the skirt and/or spacer may be configured to define and/or have one or more openings allowing for water flow past or through the skirt and/or the spacer, which openings may be defined by teeth and/or cut-out portions in the skirt and/or spacer in cooperation with the wall mount and/or another object. Such water flow may assist defining a temperature of the head and/or assist for cooling purposes. Heat from (one or more devices in) the head may suffice to drive such water flow.

The housing may comprise an optical device such as a light source and/or a camera, the optical device being mounted against, and preferably in close thermal contact with, a wall of the chamber. In particular, the optical device may be supported on a substrate extending substantially in radial direction. Also or alternatively, the optical device and/or the substrate, if present, may be mounted against, and in close thermal contact with, a wall of the chamber opposite the window, in particular a wall from which the stem protrudes, which may be a rear wall of the chamber.

Such assembly facilitates cooling of the optical device, which may extend its lifetime and/or stabilise its operation characteristics. Close thermal contact may be established by physical contact over a relatively large surface area and/or by filling voids with a substance having a large thermal conductivity, e.g. a "heat pad" which may be adhesive. The substrate may be or comprise a printed circuit board, e.g. an aluminium clad circuit board which may form a heat spreader.

Thus, the housing may comprise an optical device such as a light source and/or a camera, the optical device being supported on a substrate extending substantially radial direction, a fastener fixing the substrate against a structure of the housing. The fastener may fix the substrate in axial direction against the structure of the housing which structure may be at least part of a wall of the chamber opposite the window, which wall may be a rear wall of the chamber and/or a wall from which the stem may protrude. The fastener may comprise or be a closed or partly cut-open ring. The fastener may convert radial forces, e.g. due to its resiliency into axial forces for clamping. Such fastener may also be used for fixing another substrate extending substantially in radial direction against a structure of the housing, e.g. a wall of the chamber opposite the window, which wall may be a rear wall of the chamber and/or a wall from which the stem may protrude. A circumferentially extending fastener may provide a good hold while occupying (and obscuring) little surface area and without requiring screws, adhesives, etc., in and/or on the rear wall, although these may be provided alternatively or as well. A resilient and/or a screw ring may be preferred. A resilient circumferentially extending ring may fix itself against a circumferential wall and it may convert radial forces, due to its resiliency, into axial forces for clamping, possibly in conjunction with tapering edges on the ring and/or the wall. Also or alternatively, a resilient circumferentially extending fastener with one or more radial and/or circumferential spreaders against a circumferential wall may be provided for converting radial forces into axial forces for clamping a substrate against the rear wall.

In an aspect, an assembly is provided, which may be an underwater optical assembly as set forth herein, and which comprises a tubular wall mount, a body and a seal. The body may preferably be a housing as set forth herein. In the assembly, the wall mount has a cylindrical bore portion and the body comprises a front portion and a stem protruding from the front portion. The front portion may be a head as described. In the assembly, the stem has a cylindrical stem portion mated to the bore portion. The assembly is configured such that in an assembled configuration the stem portion fits the bore portion in an axial direction, the front portion is located in front of at least the bore portion of the wall mount, the body being attached to the wall mount with the seal extending substantially radially between the stem portion and the bore portion sealing the stem and the bore portion circumferentially, preferably providing a watertight seal. The body may plug the wall mount. The assembly is configured such that the seal traces an axially varying circumferential path, e.g. at least one of the bore portion and the stem portion comprising one or more protrusions and/or recesses in assembled configuration engaged being by one or more sealing portions of the seal and having at least one of a circumferentially varying depth, a circumferentially varying width and circumferentially varying axial position, such as having a circumferential oscillation about a predetermined axial position.

In such assembled assembly, i.e. the (stem portion of the) body being inserted into the bore portion, a rotation of the stem portion relative to the bore portion is hindered, possibly even prevented, by at least part of the seal tracing at least partially a path having a component parallel to the axis, therefore resisting forces in circumferential direction. A rotational relative orientation may therefore be determined and/or maintained.

The stem may accommodate a cable which may be connected with a device accommodated in the body for transmitting power and/or signals to and/or from the device from outside the body. E.g. the body may comprise or be a housing defining a chamber, in particular a chamber comprising a window, in which case one or more light sources and/or cameras may be comprised in (the chamber of) the said device. Thus, the mounting assembly may be used for the underwater optical assembly disclosed herein.

In any of the assemblies described herein, one or more of the following beneficial features may be employed, alone or in any suitable combination:

The housing and the wall mount may comprise cooperating structures defining one or more axial relative positions, and possibly enabling fixation in the one or more relative positions of the housing and the wall mount, e.g. along the bore portion and the stem portion and/or elsewhere, the assembly may comprise one or more of a radially extending locking member, a latch, a snap lock, any of which may be radially adjustable. E.g., one or more screws or bolts may be provided.

This may facilitate placement and/or attachment of the respective assembly, so that a particular configuration may be determined and/or maintained.

In case the assembly comprises a skirt and/or a spacer, an opening in, or defined by, the skirt and/or spacer may allow access to a locking member.

In such case of cooperating structures defining one or more axial relative positions, one of the cooperating structures may comprise a protrusion or a recess on or in one of the stem and the wall mount and another one of the cooperating structures may comprise a resilient element. E.g. a (possibly cut) ring, for engaging the protrusion or recess for defining, and possibly fixation in, the one or more axial relative positions of the stem and the wall mount may be provided. This enables a small form factor assembly. Further, locking and sealing may be effectively separated.

The seal may comprise one or more radially resiliently compressible sealing members, in particular one or more resilient sealing rings, such as an elastomeric sealing ring such as an O-ring.

Besides sealing, such sealing member(s) may provide for positioning the housing in the wall mount, e.g. for centering the housing in the wall mount. Plural seals in axial direction along the stem portion and bore portion may increase security against leaks and/or increase axial alignment and/or stability.

At least one of the stem portion and the bore portion may comprise one or more substantially circumferential recesses for accommodating one or more sealing rings. Suitable recesses may have a depth of about ⅔ of the thickness of the sealing member in direction of compression. E.g. an elastomeric O-ring may have a ring material having a circular cross section having a thickness (here: diameter) of about 3 mm, for which a recess may have a depth of about 1.8-2.2 mm, preferably about 1.9-2.1 mm. O-rings may have a non-circular cross sectional shape, e.g. having a flange-like shape of significantly larger radial size than axial size or tube-like shape of significantly smaller radial size than axial size, and/or having an x-shaped cross sectional shape.

At least one of the stem portion and the bore portion may comprise one or more recesses having an asymmetric shape in axial direction, such as a saw-tooth-like profile in axial direction, for engagement with the one or more sealing members.

Such shape facilitates insertion of the stem portion into the bore portion while hindering withdrawal. Preferably, in particular for use with elastomeric O-rings for chlorinated water, the recesses have a radial depth/the protrusions have a radial height of about 5-30% of a radial thickness of the engaging sealing member, preferably about 7-15% and/or an axial width of 20-60% of an axial thickness of the engaging sealing member, preferably about 20-30%, wherein the sealing member may be an O-ring, e.g. having circular cross sectional shape with a thickness of about 3 mm; such thickness may be selected largely independent from the O-ring size (open diameter). It has been found that such relative sizes combine a smooth insertion with both a good sealing and a good hold against withdrawal. It should be noted that in particular in public swimming pools, any apparatus and/or assembly including the presently provided, must be very robust against holding, prying, hanging, climbing and/or similar uses by any amount of users for extended periods of time without fail.

As explained herein before, the assembly may be configured such that in assembled configuration the seal traces an axially varying circumferential path, e.g. at least one of the bore portion and the stem portion comprising one or more recesses in assembled configuration engaged being by one or more sealing portions of the seal and having at least one of a circumferentially varying depth, a circumferentially varying width and circumferentially varying axial position, such as having a circumferential oscillation about a predetermined axial position.

A circumferentially varying depth may be provided by a non-circular shape of a recess accommodating an O-ring or other sealing member.

The stem portion may be slidable into the bore portion with a close running fit or better, preferably a sliding fit. E.g., the fit may be defined according to ISO standard Symbol H8-f8 or tighter with respect to a diameter of the bore portion diameter, e.g. H8-f7, or H7-g6, or even H8-h7 to H8-h6; or according to ISO standard Symbol F8-h9 or tighter with respect to a diameter of the stem portion diameter, e.g. H9-h8, or G7-h6, or even H8-h7, H7-h6. For chromium-nickel steel used under water, preferably any crevices between opposing steel surfaces are wider than 0.1 mm, more preferably wider than 1.5 mm.

The tighter the fit, the more robust the assembly may be. In an assembly wherein at least one of the stem and/or the bore portion is provided with one or more recesses and/or protrusions, such fits may be defined with respect to the smallest inner diameter of the bore portion and/or the largest outer diameter of the stem portion, respectively. However, for chromium-nickel steel used under water, preferably any crevices between opposing steel surfaces are wider than 0.1 mm, more preferably wider than 1.5 mm. Any of such fits may be compatible with commercially available O-rings for the one or more seals.

A sliding fit of the stem portion into the bore portion of any suitable (relative) size may be significantly preferred over a screw connection of the stem portion into the bore portion, e.g. for one or more of the following reasons: reduction of costs, freedom of rotational orientation, prevention of damaging a cable, facility of sealing, prevention of sharp edges and/or of narrow crevices, accommodating manufacturing tolerances, etc.

The bore portion may have an inner diameter and the stem portion may have an outer diameter, the inner diameter and the outer diameter having a size difference, and the seal may be sized to cover and fill the size difference thus sealing a space between the bore portion and the stem. Preferably, the size difference is about 1 mm or less, preferably 0.5 mm or less. Commercial elastomeric O-rings may span such gap, e.g. the O-ring having a wire thickness of about 2-4 mm, e.g. about 3 mm.

The wall mount may comprise one or more of a screw thread, a flange and a shoulder for fixing the wall mount to a wall portion.

The wall mount may be made of a metal, e.g. a stainless steel such as a chromium-nickel steel, like a 316L-grade steel. A steel wall mount may be welded to a steel wall portion, for which the flange and/or shoulder may be used. The wall mount may be screwed to a wall portion using the screw tread. A flange may also be used in case the wall mount is (to be) embedded in a flowable material e.g. concrete and/or a plastics material.

The assembly may be used in pools, ponds, and or any basin, in particular private or public swimming pools.

Herein is further provided an underwater optical assembly, which may be suitably combined with any other embodiment described herein, comprising a tubular wall mount, a housing and a seal. The wall mount has a cylindrical bore portion and the housing comprises a head and a stem rearwardly protruding from the head along an axis, the head defining a chamber with a window for dry housing an optical device in the chamber and the stem comprising an enclosed channel, preferably in fluid communication with the chamber. The stem has a cylindrical stem portion mated to the bore portion. The head has a radial head size and the stem has a radial stem size, wherein the head size is larger than the stem size, thus, the head protrudes with respect to the stem in radial direction. The head has one or more circumferential walls forwardly protruding from a substantially radial rear wall, the stem rearwardly protruding from the rear wall, the rear wall defining at least part of the larger size of the head. The stem and the one or more circumferential walls each have a thickness in radial direction, defining a rear wall area between a radial outside of the stem and a radial inside of the one or more circumferential walls, wherein the rear wall has, for at least half the radial area, preferably for at least three quarters of the radial area more preferably for more than 90% of the radial area, a thickness in axial direction that is less than a thickness in radial direction of the circumferential wall, and preferably less than a thickness in radial direction of the stem. At least part of the rear wall, in particular at least the part defining the radial area, may form at least part of a rear wall of the chamber. Thus, the rear wall provides a relatively thin wall portion over a significant portion of its radial area, so that the wall provides comparably little thermal resistance in an axial direction across the rear wall facilitating cooling of an object in contact with, or at least in close thermal contact with, one axial side of the wall, in particular in the chamber, and water in contact on the axially opposite of the wall.

The stem, the rear wall and the circumferential wall may be substantially cylindrical about the axis, preferably being substantially coaxial and/or substantially circular about the axis. This provides a relatively robust construction, even if said thickness of the rear wall is small.

The said thickness of the rear wall may be less than 3 mm, preferably less than 2 mm more preferably less than 1 mm. It has been found that the thinner the material the better the heat conduction. It has also been found that using common underwater lamp and/or -mounting materials such as stainless steel varieties suitable for water basins like swimming pools may provide sufficient robustness at such thicknesses for use in swimming pools.

Said thickness of the rear wall may be substantially constant at least one of around the axis and from the stem to the at least one circumferential wall. Thus, a constant thermal resistance may be provided around the axis and/or from the stem to the at least one circumferential wall. This may prevent local hot spots and/or other thermal fluctuations.

An optical device in the chamber of any embodiment comprising a chamber may be connected to one or more of a power source, a detector, and a controller via a cable accommodated through the stem of the assembly.

BRIEF DESCRIPTION OF THE DRAWINGS

The above-described aspects will hereafter be more explained with further details and benefits with reference to the drawings showing a number of embodiments by way of example.

In the Figures.

DETAILED DESCRIPTION OF EMBODIMENTS

It is noted that the drawings are schematic, not necessarily to scale and that details that are not required for understanding the present invention may have been omitted. The terms "upward", "downward", "below", "above", and the like relate to the embodiments as oriented in the drawings, unless otherwise specified. Further, elements that are at least substantially identical or that perform an at least substantially identical function are denoted by the same numeral, raised by 100, 200, etc. for different embodiments.

Further, unless otherwise specified, terms like "detachable" and "removably connected" are intended to mean that respective parts may be disconnected essentially without damage or destruction of either part, e.g. excluding structures in which the parts are integral (e.g. welded or molded as one piece), but including structures in which parts are attached by or as mated connectors, fasteners, releasable self-fastening features, etc. The verb "to facilitate" is intended to mean "to make easier and/or less complicated", rather than "to enable".

Figure 1A:
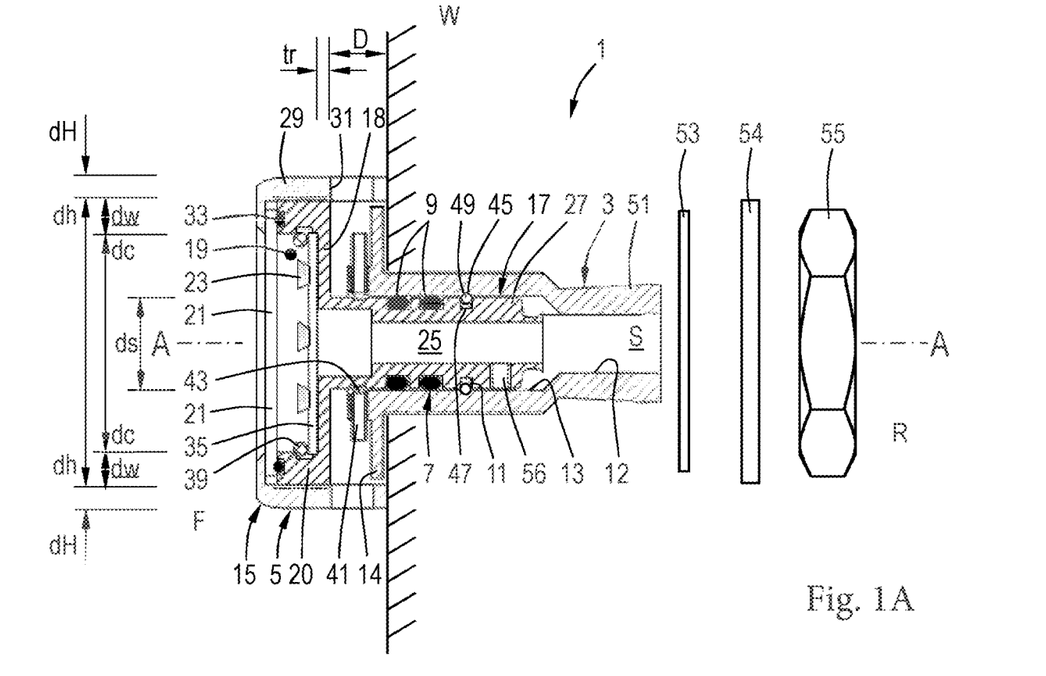
FIG. 1A is a schematic cross section of an embodiment.

FIG. 1A shows an underwater optical assembly 1 with several optional members. The assembly 1 has a front side F and a rear side R and it is axially symmetric about an axis A. The assembly 1 comprises a tubular wall mount 3, a housing 5 and a seal 7. Here, the seal 7 comprises two sealing members 9, received in recesses 11 in the housing 5.

The wall mount 3 has a bore 12 comprising a cylindrical bore portion 13. The wall mount 3 also has an optional radially outward extending flange 14.

The housing 5 comprises a head 15 and a stem 17 rearwardly protruding from the head 15. The head 15 defines, e.g. by a rear wall 18 and one or more side walls 20, a chamber 19 with a window 21 for dry housing a plurality of optical devices 23 such as light sources, preferably LED light sources, in the chamber 19. The stem 17 comprises an enclosed channel 25 in fluid communication with the chamber 19. The head 15 and/or the stem 17 may be formed from different parts releasably or permanently fixed together, but here the head 15 and stem 17 are formed as a unitary object. The housing and head may have a shape with characteristic size dH and hd, respectively, e.g. being elliptic or circular with (largest) diameter dH and, respectively, dh. The stem may likewise have an outer characteristic size (e.g. diameter) ds. Here the term "characteristic size" should be understood to exclude local recesses like screw threads and O-ring grooves etc. for determining a face of a structure.

The chamber 19 may have an inner characteristic size dc determined by the characteristic head size dh and a characteristic thickness dw of a side wall 20 of the head 15.

The rear wall 18 has a radial area Arw between radial outside of the stem 17 (here: ds) and the radial inside of the side wall 20 (here: dc) of Arw=$\pi(dc/2)^2-\pi(ds/2)^2$. The surface area and thickness of the rear wall may be determined to provide a desired thermal resistance, and therewith a desired cooling power for heated elements, e.g. operating light sources, towards the water across the rear wall 18. Note that in some cases the assembly could be used to warm up elements by surrounding water of higher temperature than an object inside the chamber 19.

In the shown embodiment, the rear wall 18 is substantially planar and flat for substantially all of its radial area Arw on an inside of the chamber 19 and on an outside of the chamber 19, the flatness on either side being preferred, but independent, options determining constantness of the thickness of the rear wall 18. As an option, the rear wall 18 may have a radially varying thickness, e.g. the thickness reducing with increasing radial distance from the stem, which accommodates both structural strength and robustness, and reduced thermal resistance. Also or alternatively, the rear wall 18 may be provided with ribs and/or protrusions for robustness and/or for defining an insertion depth into the wall portion W (and thus into the wall mount) and/or defining a separation D of the head 15 from the flange 14 and/or from the wall portion W.

E.g., for an exemplary circular housing with dimensions dH=48 mm, dh=37 mm and ds=14.4 mm, Arw=912 mm². For a rear wall of 1 mm thick stainless steel having a thermal conductivity at 20° C. of 15 W/(m·K), an average cooling power of 13.7 W per Kelvin temperature difference across the rear wall may be achieved, while additional cooling power is provided by conduction through the stem and/or the side wall(s). Hence, such assembly facilitates operating high power devices such as LEDs at relatively low operating temperatures when immersed in water at about 25-30° C., common temperatures in swimming pools.

The stem 17 has a cylindrical stem portion 27 mated to the bore portion 13. The assembly 1 is configured such that in an assembled configuration, as shown, the stem portion 27 fits the bore portion 13 in an axial direction with respect to axis A. Also, the head 15 is located in front of the bore portion 13 of the wall mount 3. Thus, the housing 5 is attached to the wall mount 3 and plugging (at least the bore portion 13 of) the wall mount 3 with the seal 7 extending substantially radially between the stem portion 27 and the bore portion 13 sealing the assembly circumferentially watertight.

FIG. 1A further shows that the enclosed channel 25 extends through the stem 17 from one axial side of the seal 7 (e.g. towards front side F) to an opposite axial side of the seal 7 (towards rear side R) and the assembly 1 is configured such that in the assembled state (as shown) the chamber 19 is in fluid communication with a space S behind the seal 7, as seen from the head 15, here the space S comprises a lumen of the bore 12 of the wall mount 3.

FIG. 1A further shows that the housing 5 comprises a skirt 29. The shown skirt 29 optionally extends aside from and along part of the stem 17 from the head 15. The skirt 29 comprises plural openings 31. The skirt 29 is fixed to the head 15, e.g. by a screw connection. A large size of the connection between the skirt 29 and the head 15, e.g. a contact surface area along a fine-pitch screw thread, may facilitate conducting heat towards or from the head to the skirt and to surrounding water. Here, the skirt 29 and the head 15 together clamp the window 21 and a seal 33 (here: an O-ring) to provide a watertight chamber in the housing 5, at least on the front side F. In other embodiments, not shown, the window may be attached differently and/or the skirt and window may be integrated. The skirt 29 may abut a wall W into which (the wall mount 3 of) the assembly 1 is mounted; the head 15 then is separated from the wall W by a distance D so that water may access and flow past the head 15 on a rear side of the head 15. In FIG. 1A, the skirt 29 overlaps at least part of the flange 14 of the wall mount 3, as an option. The size of the openings 31, e.g. a diameter and/or a largest open distance between opposite sides of a circumference of the opening, may be about 7 mm or smaller. The size D preferably is in a range of 5-10 mm and may be about 7 mm and/or be in correspondence with the size of the openings 31. The openings 31 may be arranged for reduction of size and/or of water flow obstruction of the assembly, e.g. in line with the rear wall as shown.

FIG. 1A further shows that the housing 15 comprises optical devices 23, e.g. one or more LED-lights and a miniature camera, that are mounted to and supported on a substrate 35. The substrate 35 is mounted against and in close thermal contact with a rear wall of the chamber 19, also forming the rear wall 18 of the head 15. For fixing the substrate 35 against the rear wall, the shown housing 5 comprises an at least partly circumferentially extending fastener 39, e.g. a closed or partly cut-open resilient ring providing an outward retention force against a side wall.

FIG. 1A shows several options of cooperating structures defining one or more axial relative positions of the housing 5 and the wall mount 3. Some also enable fixation in such position. E.g. the assembly 1 comprises radially extending screws 41, e.g. parker screws having inner hexagon, accessible via one or more openings 31 in the skirt 29, which may engage in one or more optional recesses like groove 43 in (the stem 17 of) the head 15. As another example, one of the cooperating structures comprises a recess 45 in the wall mount 3 (here: in the bore portion 13 of) and another one of the cooperating structures comprises a recess 47 in the stem portion 17 of the housing 5 for holding a resilient cut ring 49, for engaging the recess 45 as shown; the ring 49 is urged outward to fix (the stem 17 of) the housing 5 in (the bore 12 of) the wall mount 3. Similarly, recesses for holding part of the sealing members 9 may be provided in the bore portion 13.

On a rear side of the wall mount 3 an optional tube mount portion 51 is provided, e.g. for attachment of a tube over the mount portion, e.g. for embedding the wall mount 3 in a thick wall portion. Further are shown as options a resilient ring 53, a washer 54, and a nut 55, which may be used in any suitable combination for attachment of the wall mount 3 to and through a thin wall portion, e.g. of steel, polymer or any other suitable material, for which the wall mount 3 may have a screw thread portion (not shown).

A cable (not shown) may be accommodated through the stem 17 and the bore 17 of the assembly 1 for connecting an optical device 23 in the chamber 21 to one or more of a power source, a detector, and a controller (none shown) via the cable. A screw 56 or other retainer for fixing the cable to the housing may be provided, e.g. a wedge, a clamp, a tie-rip, etc. A rear end of the stem 27 may be profiled or otherwise shaped for retaining a sleeve and/or other stress relief portion for the cable (none shown).

An underwater lamp as shown in FIG. 1A with stem size ds of about 25 mm, head size dh of about 45 mm and housing size of about 50 mm, spaced from a wall W by a distance D of about 10 mm has been successfully tested with LED lights providing well over 3000 lm optical power for prolonged periods; only 14 such assemblies suffice to illuminate a 25 m×12.5 m standard match swimming pool. Higher optical powers of up to 6000 lm appear feasible in an assembly of such sizes. Thus, a particularly small, and robust, underwater lamp has been provided.

Figure 1B:
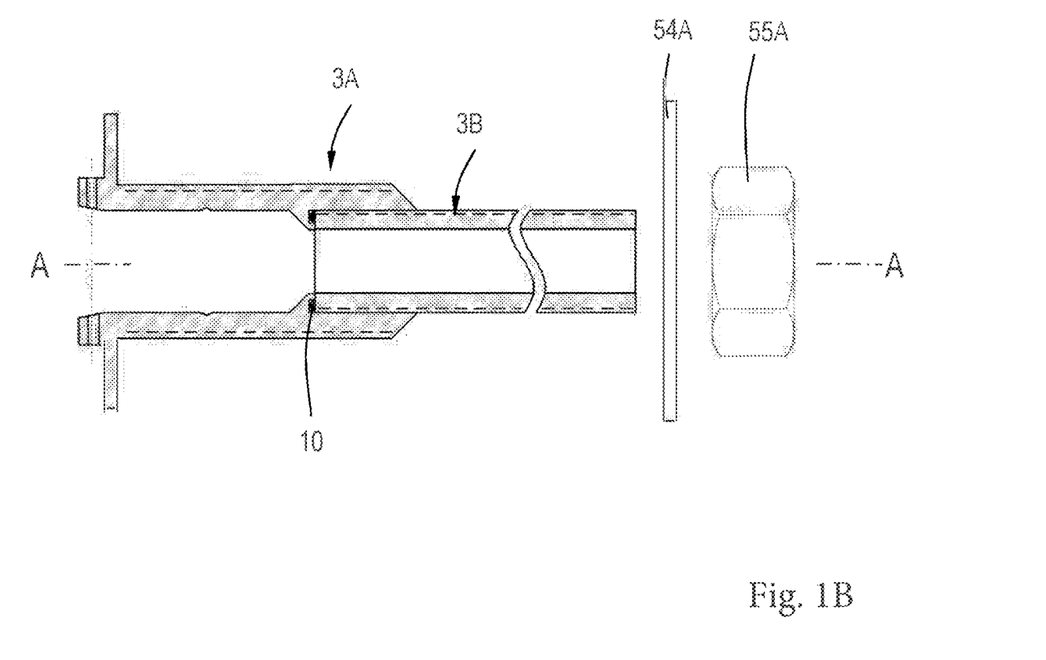
FIG. 1B is a schematic cross section of a wall mount for use in any embodiment disclosed herein.

FIG. 1B shows as an option a wall mount 3A provided with an extension tube 3B. The extension tube 3B may be fixed in any suitable manner to the wall mount 3A, here using a screw thread. An optional seal 10 ensures water tightness of the extended mount 3A. A washer 54A and a nut 55A optionally also a resilient ring (not shown) may be provided, just as in FIG. 1A, for attachment of the wall mount 3A to and through a thick wall portion, e.g. of concrete. In an embodiment, not shown, an extension tube may be formed with the same outer diameter as the wall mount to which it is (to be) attached. Such wall mount 3A provided with an extension tube 3B maybe included in any assembly disclosed herein. An assembly comprising the wall mount 3A may comprise extension tubes of different lengths.

Figure 2:
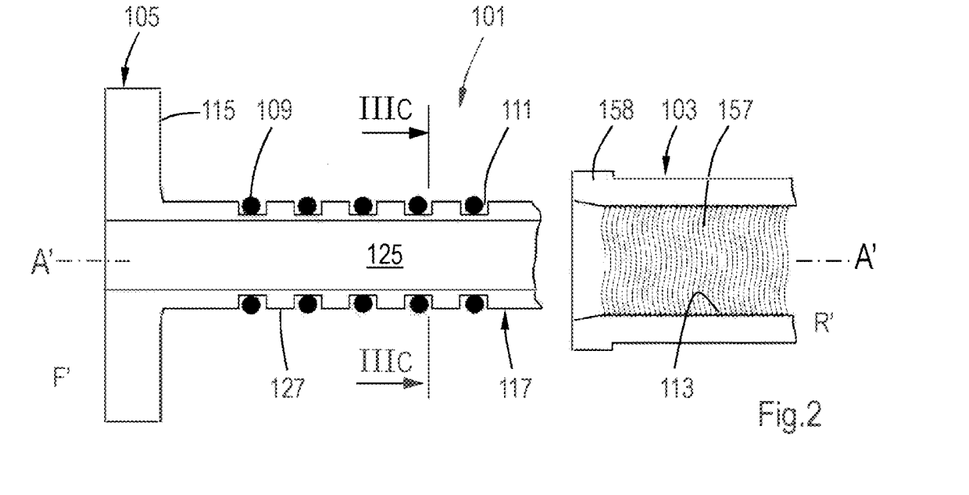
FIG. 2 is a schematic cross section of another embodiment.

FIG. 2 shows an assembly 101 which, inter alia, differs from the assembly of FIG. 1A by not being an underwater lamp. Otherwise any and all features of the embodiments may be suitably combined.

The assembly 100 has a front side F' and a rear side R' and it is axially symmetric about an axis A'.

The assembly 100 comprises a tubular wall mount 103, a body 105 and a seal. Here, the seal comprises a series of sealing members 109, received in recesses 111 in (the stem 117 of) the body 105. Note that the body 105 may be formed differently and may be or resemble a housing 5 as described above. In FIG. 2, the wall mount 103 has a cylindrical bore portion 113. The body 105 comprises a front portion 115, here comprising a flange, and a stem 117 rearwardly protruding from the front portion 115. The stem 117 has a cylindrical stem portion 127 mated to the bore portion 113. The stem 117 comprises an enclosed channel 125. The assembly 100 is configured such that in an assembled configuration (not shown) the stem portion 127 fits the bore portion 113 in an axial direction (along A'), the front portion 115 is located in front of at least the bore portion 113 of the wall mount 103, the body 105 being attached to the wall mount 103 with the seal extending substantially radially between the stem portion 127 and the bore portion 113 sealing the stem 117 and the bore portion 113 circumferentially, which may be watertight. If the body 105 is watertight, e.g. solid or comprising a window, a panel, or another object, etc., the body 105 may plug the wall mount 103 watertightly.

The assembly 100 is configured such that the seal traces an axially varying circumferential path: the bore portion 113 comprises a series of recesses 157 which in assembled configuration are to be engaged being by one or more sealing members 109 of the seal.

The recesses 157 have an asymmetric shape in axial direction, in particular a saw-tooth-like profile in axial direction, with the steep slope towards the front F', thus causing the bore diameter to narrow relatively gently from front (F') to rear (R') back and widen relatively suddenly, as latches. This arrangement facilitates insertion of (the stem portion 117 of) the body 105 into (the bore portion 113 of) the wall mount 103, but hinders withdrawal. Insertion is further facilitated by an optional lead-in into the bore 112, here a flaring portion 158.

Further, the recesses 157 are annular and have a circumferentially varying axial position, e.g. having a circumferential oscillation (which may comprise a compounded sinusoidal oscillation as shown) about a predetermined axial position. This arrangement hinders or prevents, in assembled state rotation of the of (the stem portion 117 of) the body 105 relative to (the bore portion 113 of) the wall mount 103. This occurs in particular after some time when the sealing members 109 have relaxed and adapted to the engagement with the ribs and recesses 157.

Depending on the relative sizes of (one more sealing members 109 of) the seal and at least some of the recesses 157 in axial direction and radial direction as well as with respect to an amplitude of axial oscillations of the recesses 157, the engagement and prevention of relative movement may vary and possibly vary over time dependent on resiliency of (the sealing members 109 of) the seal.

It is to be noted that the engagement and prevention of relative movement may be largely position independent in the sense that the body 105 may be inserted into the wall mount 103 to any depth and be substantially fixed there as explained above. This allows adaptation of the assembly to a wall thickness; see also the discussion regarding FIG. 4 below.

Figure 3A:
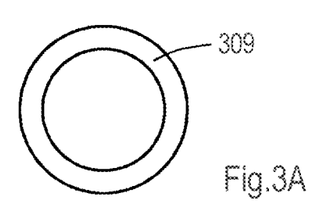
FIGS. 3A and 3B are top and cross section views of sealing members.
Figure 3B:
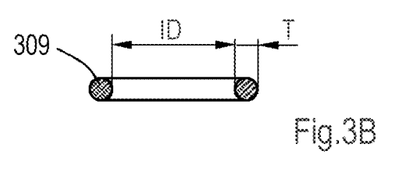
Figure 3C:
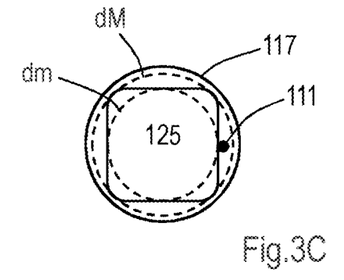
FIG. 3C is a schematic cross section view of a recess for a sealing member.

FIGS. 3A-3B indicate an exemplary circular O-ring 309 for a seal, having a size determined by an inner diameter ID and a thickness T. FIG. 3C is a cross sectional view of the body 105 as indicated in FIG. 2, showing that the recess 111 has, as an option, a varying radial size provided by a non-circular recess depth into the stem 127, wherein the radial size varies between a minimum diameter dm and a maximum diameter dM (which may be equal to an outer size of the stem 117 i.e. local absence of a recess. The radial sizes/depth variation may be in accordance with minimum and maximum allowable sealing pressures and/or resiliency compression destruction strength of the O-ring. A similar non-circular shape could be provided for a recess in the bore. The stem itself may also have a non-circular outer shape and/or the bore have a non-circular outer shape; although a circular cylindrical shape is preferred.

Figure 4:
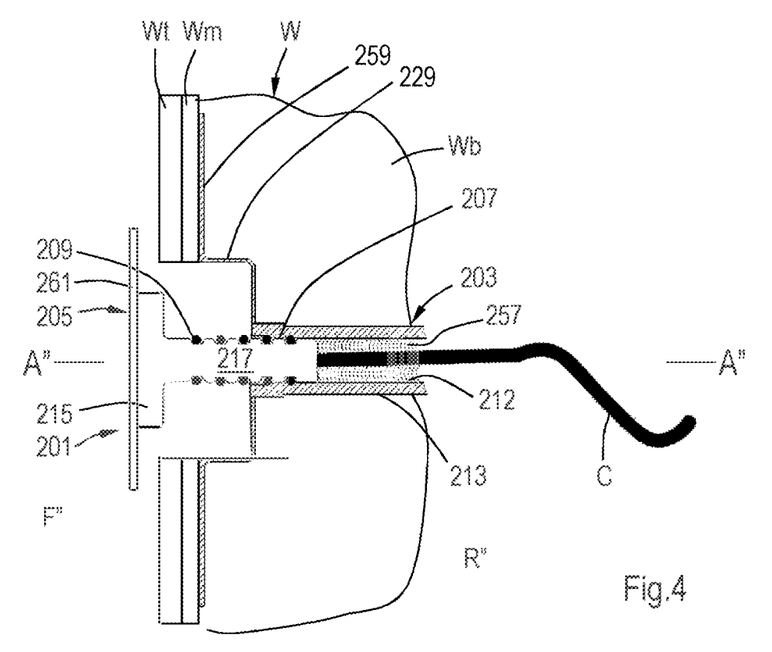
FIG. 4 is a schematic cross section of a further embodiment.

FIG. 4 shows an underwater optical assembly 201 (partly) mounted in a wall W. The assembly 1 has a front side F''' and a rear side R'' and it may be axially symmetric about an axis A''. The assembly 201 comprises a tubular wall mount 203, a housing 205 and a seal 207. The wall mount 203 has a bore 212 comprising a cylindrical bore portion 213. The housing 205 comprises a head 215 and a stem 217 rearwardly protruding from the head 215. The head 215 defines a chamber (not shown) with a window (not shown) for dry housing a plurality of optical devices such as light sources and/or cameras. The stem 217 comprises an enclosed channel in fluid communication with the chamber, the bore 212 and further spaces accommodating a cable C connected to the optical device in the chamber in the head 215.

Just as in FIG. 2, (the bore portion 213 of) the wall mount 203 comprises annular recesses 157 having a sawtooth-like axial profile and a circumferentially varying axial position, and (the stem portion of) the stem 217 of the housing 205 has plural sealing members 209, so that the assembly may be assembled as discussed with respect to FIGS. 1 and 2 by insertion of the stem 217 into the bore 212 of the wall mount 203.

In FIG. 4, the exemplary wall W comprises a base portion Wb, e.g. concrete, covered with a mortar Wm and tiles Wt. However, any other type of wall (or soil instead of or in addition to one or more wall portions) could be used. In FIG. 4, the assembly 201 partly embedded into the wall W; the wall mount 203 comprises a skirt 229 directed forward. Instead of a skirt 229 a pot could be provided to which the wall mount 203 is attached to achieve a similar shape. The skirt 229 is provided with an optional flange 259 facilitating waterproof attachment to the wall W; here by fitting the flange in the layer mortar Wm behind the tiles Wt. The housing 205 comprises a flange 261 radially extending from the housing 205 and here, as preferred, sized to cover and close off the skirt 229, but a smaller or larger size could be used; the flange 261 preferably comprises one or more openings for passage of water, facilitating cooling of the head 215. Such assembly may cause that the flange 261 abuts (a front of) the wall W and provide a substantially flat configuration, e.g. protruding no more than a thickness t of the flange 261 from the wall W. Any local thickness variation of the wall W (in particular the mortar and/or tile layers Wm, Wt) with respect an intended and/or expected thickness may be accommodated by the insertion depth of (the stem 207 of) the housing 205 into (the bore 212 of) the wall mount 203. The seal 209 and the cooperating fixation structures ensure that the housing cannot be withdrawn accidentally and/or without tools. Note that in the assembly of FIG. 1A, the openings 31 in the skirt 29 may serve to accommodate one or more tools to pry the housing 5 from the wall mount 3, possibly providing a fulcrum for such tool. Also or alternatively, the flange could comprise one or more rearwardly extending protrusions or rings and/or the housing could be provided with a skirt, which could be sized to fit the into the recess and/or other features in the wall W, e.g. a skirt having a size to fit the skirt of the wall mount. This may facilitate that the assembly is mounted flush with a surface of the wall W. If so desired, the flange 261 may be (further) fastened to the wall W and/or the flange 259 of the wall mount 203 using one or more additional fasteners, e.g. screws, bolts, etc.

Figure 5:
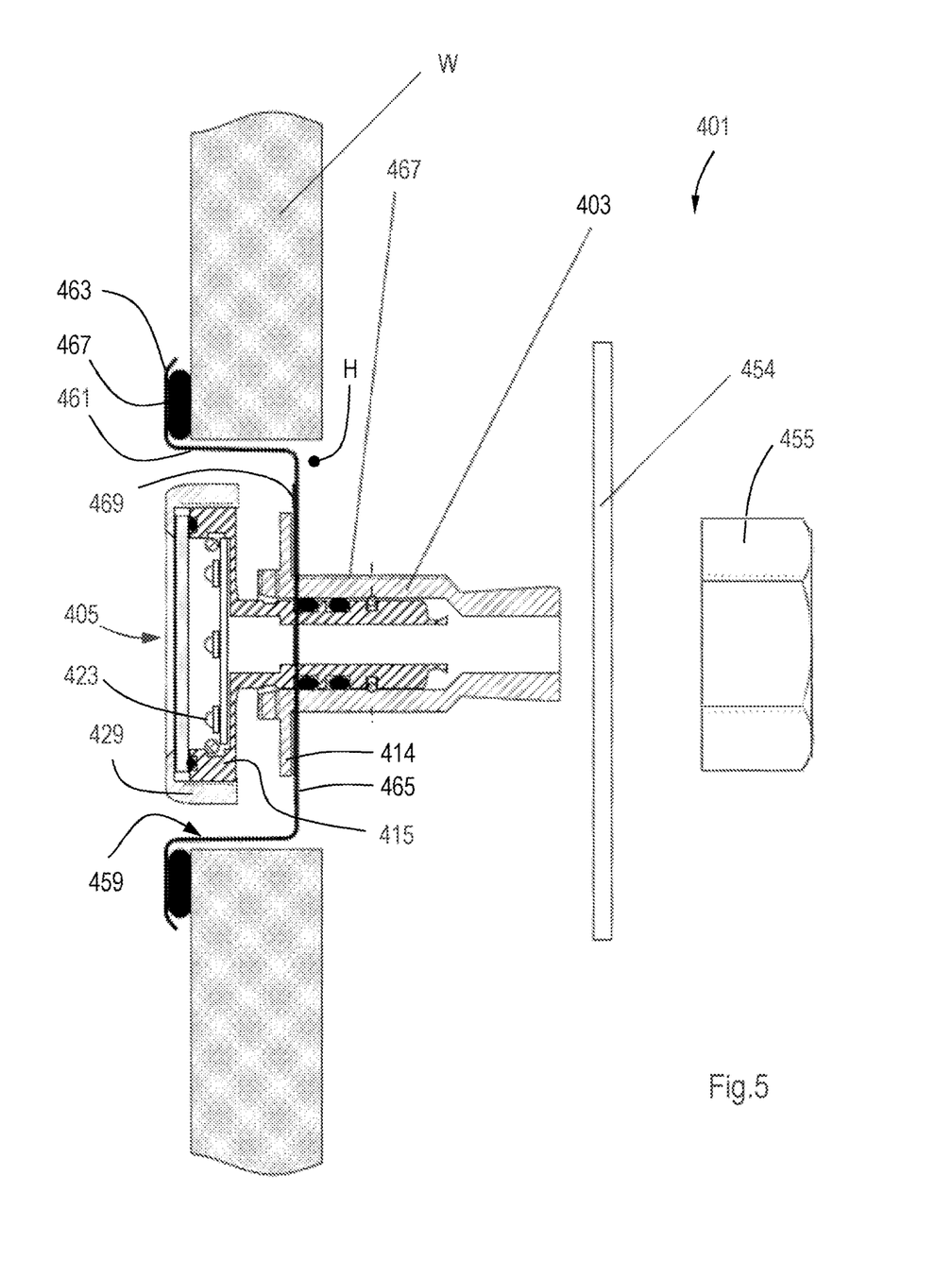
FIG. 5 is a schematic cross section of another embodiment similar to FIG. 1A.

FIG. 5 shows an assembly 401 comprising a housing 405 generally the same as that of FIG. 1A. However, in this case as an option the skirt 429 does not extend further rear ward than the head 415. In this assembly 401, an adapter 459 is provided, in the form of a pot fitting a hole H in the wall W and providing a recess for accommodating the head of the housing 405 so that the front of the housing 405 may be mounted substantially flush with the adapter 459 and/or wall W.

The adapter 459 comprises a side wall 461, a front flange 463 and a rear wall 465. The front flange 463 covers part of the wall W and optionally accommodate a sealing member like O-ring 467. The rear wall 465 accommodates the wall mount 403, provided with a screw thread 467. The wall mount may be fixed to the rear wall 465 by washer 454 and nut 455, possibly with a resilient ring as before (not shown). Between the flange 414 of the wall mount and the rear wall 465 a seal such as a resilient sheet 469 may be provided to provide a water tight connection. The washer 454 and/or an additional mounting plate or similar device (not shown) spans the hole H in the wall W. Using the nut 455, the front flange 463 and the mounting washer 454 are pulled together clamp the assembly 400 in the wall W providing a water tight construction by virtue of the seals 467 and 469.

Since the head 415 of the housing 405 is separate from the rear wall 465, water can flow behind the head 415 to cool LEDs 423 or other objects in the head 415.

The disclosure is not restricted to the above described embodiments which can be varied in a number of ways within the scope of the claims. For instance, a housing or body may comprise plural stems for use with plural wall mounts and/or a wall mount comprising plural bores. The parts of the assemblies may have different shapes and/or different size ratios. The assembly and constituent parts thereof (housing, body, wall mount) need not be axially symmetric. The housing need not be monolithic as shown.

Elements and aspects discussed for or in relation with a particular embodiment may be suitably combined with elements and aspects of other embodiments, unless explicitly stated otherwise.

What is claimed is:

1. An underwater optical assembly, comprising a tubular wall mount, a housing and a seal; wherein
   the wall mount has a bore portion;
   the housing comprises a head and a stem rearwardly protruding from the head along an axis, the head defining a chamber with a window for dry housing an optical device in the chamber and the stem comprising an enclosed channel;
   the stem has a stem portion mated to the bore portion
   the head has a radial head size and the stem has a radial stem size, the radial head size is larger than the radial stem size,
   the head has one or more circumferential walls forwardly protruding from a substantially radial rear wall, the stem rearwardly protruding from the rear wall,
   the stem and the one or more circumferential walls each have a thickness in a radial direction, defining a rear wall area between a radial outside of the stem and a radial inside of the one or more circumferential walls, wherein the rear wall has, for at least half its radial area, a thickness in an axial direction of one said circumferential wall that is less than a thickness in a radial direction of that circumferential wall,
   the assembly comprises the optical device mounted against, and in close thermal contact with, the rear wall; and
   wherein the assembly comprises
   one or more structures spacing at least part of the head from at least part of a forwardly oriented end of the wall mount for passage of water along and in contact with the rear wall area and around the enclosed channel.

2. The underwater optical assembly according to claim 1, wherein the stem, the rear wall and the circumferential wall are substantially cylindrical about the axis.

3. The underwater optical assembly according to claim 1, wherein said thickness of the rear wall is less than 3 mm, at least on average, in the radial direction.

4. The underwater optical assembly according to claim 1, wherein said thickness of the rear wall is substantially constant for at least one of around the axis and from the stem to at least one said circumferential wall.

5. The underwater optical assembly as claimed in claim 1, wherein the assembly is configured such that in an assembled configuration the stem portion fits the bore portion in an axial direction, the head is located in front of at least the bore portion of the wall mount, the housing being attached to the wall mount and plugging the wall mount with the seal extending substantially radially between the stem portion and the bore portion thereby circumferentially sealing the assembly watertight.

6. The underwater optical assembly according to claim 1, wherein the enclosed channel extends through the stem from one axial side of the seal to an opposite axial side of the seal and the assembly is configured such that in an assembled state the chamber is in fluid communication with a space behind the seal, as viewed from the head.

7. The underwater optical assembly according to claim 1, wherein the housing has a radial housing size and the stem has a radial stem size, and the housing size is larger than the stem size in a range of 2-8 times the stem size.

8. The underwater optical assembly according to claim 1, wherein the structures comprise a skirt and/or a spacer which extends aside from and along at least part of the stem.

9. The underwater optical assembly according to claim 1, wherein the structures comprise a flange radially extending from the housing.

10. The underwater optical assembly according to claim 1, wherein the housing comprises an at least partly circumferentially extending fastener for fixing, in axial direction, a substrate extending substantially in a radial direction against a structure of the housing.

11. The underwater optical assembly according to claim 1, wherein the housing and the wall mount comprise cooperating structures defining one or more axial relative positions of the housing and the wall mount.

12. The underwater optical assembly according to claim 11, wherein one of the cooperating structures comprises a protrusion on or a recess in one of the stem and the wall mount and another one of the cooperating structures comprises a resilient element for engaging the protrusion or recess for defining one or more axial relative positions of the stem and the wall mount.

13. The underwater optical assembly according to claim 1, wherein the seal comprises one or more radially resiliently compressible sealing members.

14. The underwater optical assembly according to claim 12, wherein at least one of the bore portion and the stem portion comprises one or more recesses having an asymmetric shape in an axial direction for engagement with the one or more sealing members.

15. The underwater optical assembly according to claim 1; wherein in the assembly
the body comprises a front portion, the assembly is configured such that in an assembled configuration the stem portion fits the bore portion in an axial direction, the front portion is located in front of at least the bore portion of the wall mount, the body being attached to the wall mount, with the seal extending substantially radially between the stem portion and the bore portion circumferentially sealing the stem and the bore portion, the assembly is configured such that the seal traces an annular and axially varying circumferential path, at least one of the bore portion and the stem portion comprising at least one selected from the group consisting of one or more protrusions, one or more recesses, and combinations thereof, in an assembled configuration being engaged by one or more sealing portions of the seal and having at least one of a circumferentially varying depth, a circumferentially varying width and a circumferentially varying axial position.

16. The underwater optical assembly according to claim 1, wherein the stem portion and the bore portion are mated such that the stem portion is slidable into the bore portion with a close running fit according to ISO standard Symbol H8-f8 or tighter with respect to a diameter of the bore portion, or the close running fit being according to ISO standard Symbol F8-h9 or tighter with respect to a diameter of the stem portion.

17. The underwater optical assembly according to claim 1, wherein the wall mount comprises one or more of a screw thread, a flange and a shoulder for fixing the wall mount to a wall portion.

18. A basin comprising an underwater optical assembly according to claim 1.

19. The basin according to claim 18, the assembly comprising an optical device in the chamber that is connected to one or more of a power source, a detector, and a controller via a cable accommodated through the stem of the assembly.

20. The underwater optical assembly according to claim 1, wherein the optical device is supported on a substrate extending substantially in a radial direction and the substrate is mounted against and in close thermal contact with a wall of the chamber opposite the window.

21. The underwater optical assembly according to claim 1, wherein the optical device comprises a light source.

22. The underwater optical assembly of claim 1, wherein at least one of the skirt and spacer comprises teeth configured to define one or more openings that allow passage of water.

23. The underwater optical assembly of claim 1, wherein at least one of the skirt and spacer comprises cut-out portions configured to define one or more of said openings that allow passage of water.

24. The underwater optical assembly according to claim 1, wherein the structures comprise a spacer which extends aside from and along at least part of the stem.

* * * * *